E. I. DODDS.
STAY BOLT FOR BOILERS.
APPLICATION FILED OCT. 19, 1914.
1,229,909.
Patented June 12, 1917.
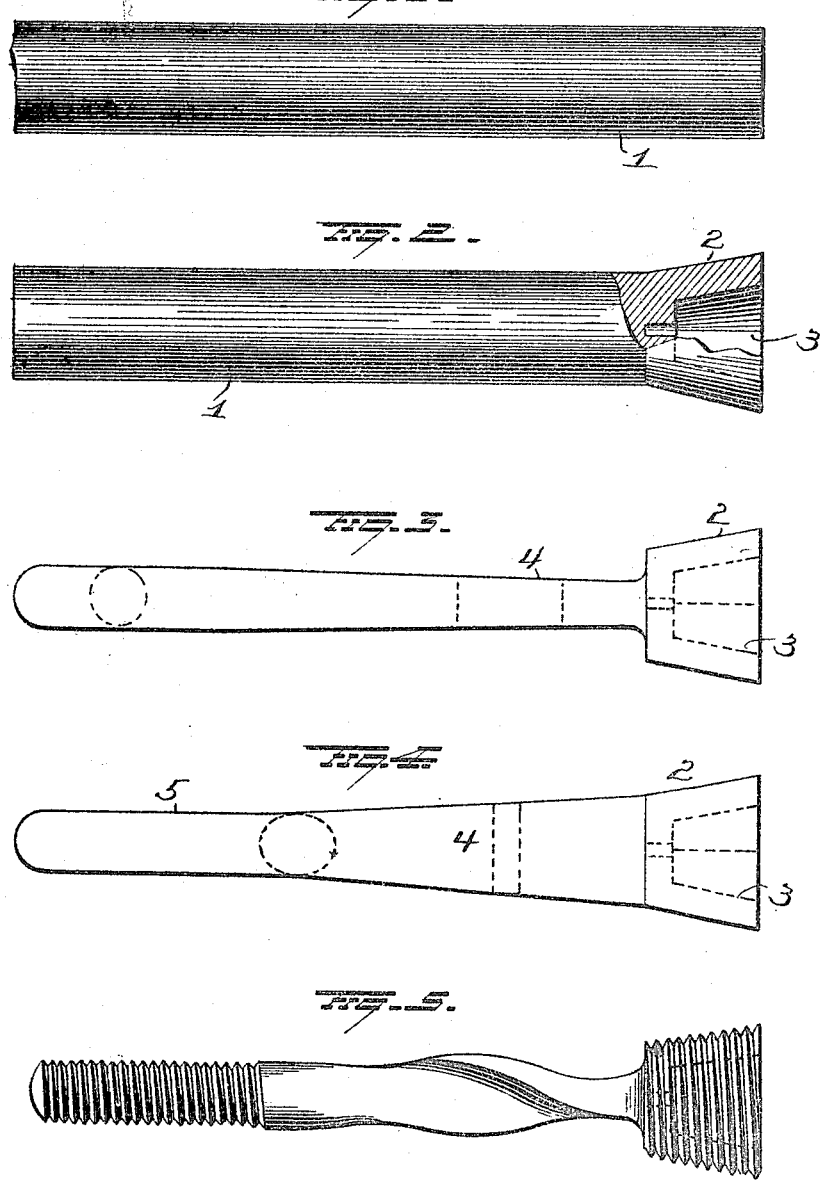
WITNESSES
INVENTOR
Attorney

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT FOR BOILERS.

1,229,909.  Specification of Letters Patent.  Patented June 12, 1917.

Application filed October 19, 1914. Serial No. 867,414.

*To all whom it may concern:*

Be it known that I, ETHAN I. DODDS, of Pittsburgh, in the county of Allegheny and State of Pennsylvania, have invented certain new and useful Improvements in Stay-Bolts for Boilers; and I do hereby declare the following to be a full, clear, and exact description of the invention, such as will enable others skilled in the art to which it appertains to make and use the same.

My invention relates to an improvement in stay bolts for boilers and is adapted particularly as a repair bolt for taking the place of stay bolts that have been damaged and removed, the object being to provide a flexible bolt capable of withstanding the vibratory, tensile and compression strains up to the maximum capacity of the metal employed.

With this object in view my invention consists in the details of construction as will be more fully described and pointed out in the claims.

In the accompanying drawings Figure 1 is a view of the blank from which the bolt is made; Fig. 2 is a view showing the bar with the head formed thereon; Figs. 3 and 4 are views in elevation showing the shape of the shank and Fig. 5 is a view of the completed bolt.

The bolt is made from a cylindrical bar, one end of which is upset to form a tapering head 2 and flattened from the head to a point near its other end.

As shown in Figs. 3 and 4, the shank 4 of the bolt is wider adjacent the head and gradually tapers toward its free end where it merges into a cylindrical section 5 of less diameter than the blank, which section 5 is threaded for its attachment to a boiler sheet. As before stated the bolt is gradually tapered toward the cylindrical end 5, but as it decreases in width it proportionately increases in thickness so that the cross sectional area of the bolt is the same at all parts of the shank.

The head 2 of the bolt is formed by upsetting one end of the blank, and it is made tapering as shown and threaded externally and provided with an internal angular recess to be engaged by a wrench or other tool employed for attaching it to the boiler sheets. After the shank has been flattened and tapered as shown, the cylindrical end of the shank is threaded either by cold or hot rolling or dies, and the flattened and tapered shank is twisted about 180° so that the shank will be free to give or bend at some point between its extremes in any direction the vibrations or movements of the sheet tend to carry the same. In other words the flattened shank bent in the form of a spiral, will give or yield in any and all directions.

By means of the tapering shank, having approximately the same cross sectional area throughout its length, I secure a bolt shank that is of equal tensile capacity throughout its length but is as before stated free to give or yield under torsion or vibratory strains. Again by flattening the shank I get the outer fibers nearer the neutral axis of the shank which permits of considerable deflection without injuriously straining the outer fiber of the bolt.

Having fully described my invention what I claim as new and desire to secure by Letters-Patent, is:—

1. A stay bolt having a flattened and tapered shank, the cross sectional area of the latter being approximately uniform throughout its length.

2. A stay bolt having a flattened tapered and twisted shank, the cross sectional area of the latter being approximately uniform throughout its length.

3. A stay bolt threaded at one end and provided with an enlarged head at the other end, the portion of the shank between the threaded end and the head being flattened and tapered and of approximately the same cross sectional area throughout its length.

4. A stay bolt cylindrical and threaded at one end and provided with an enlarged head at its opposite end, the shank or portion of the bolt between the threaded end and head being flattened and tapered and of approximately the same cross sectional area throughout its length and gradually merging into the cylindrical threaded end, the latter being of less diameter than the head.

5. A stay bolt having an enlarged head at one end, the other end being cylindrical and threaded, the shank of the bolt being flattened, tapered and twisted, and of approximately the same cross sectional area throughout its length, and gradually merging into the cylindrical threaded end.

In testimony whereof, I have signed this specification in the presence of two subscribing witnesses.

ETHAN I. DODDS.

Witnesses:
 B. E. D. STAFFORD,
 EDWIN S. RYCE.

Copies of this patent may be obtained for five cents each, by addressing the "Commissioner of Patents, Washington, D. C."